United States Patent
Long (10) Patent No.: US 11,072,733 B2
(45) Date of Patent: Jul. 27, 2021

(54) MIXED REFRIGERANT FOR A CRYOGENIC TEMPERATURE RANGE, AND METHODS FOR PREPARING AND APPLYING THE SAME

(71) Applicant: Zhigang Long, Beijing (CN)

(72) Inventor: Zhigang Long, Beijing (CN)

(73) Assignee: Zhigang Long, Beijing (CN)

( * ) Notice: Subject to any disclaimer, the term of this patent is extended or adjusted under 35 U.S.C. 154(b) by 40 days.

(21) Appl. No.: 16/379,437

(22) Filed: Apr. 9, 2019

(65) Prior Publication Data
US 2019/0309202 A1   Oct. 10, 2019

(30) Foreign Application Priority Data
Apr. 10, 2018   (CN) .......................... 201810315387.8

(51) Int. Cl.
*C09K 5/04*   (2006.01)
(52) U.S. Cl.
CPC ........ *C09K 5/044* (2013.01); *C09K 2205/122* (2013.01); *C09K 2205/126* (2013.01); *C09K 2205/13* (2013.01); *C09K 2205/132* (2013.01)
(58) Field of Classification Search
CPC ........ C09K 2205/122; C09K 2205/126; C09K 2205/13; C09K 2205/132; C09K 5/044
See application file for complete search history.

(56) References Cited

FOREIGN PATENT DOCUMENTS

| CN | 1210130 A | 3/1999 |
|---|---|---|
| CN | 1361399 A | 7/2002 |
| CN | 1388887 A | 1/2003 |
| CN | 1460703 A | 12/2003 |
| CN | 1475544 A | 2/2004 |
| CN | 201104043 Y1 | 8/2008 |
| CN | 102559146 A | 7/2012 |

(Continued)

OTHER PUBLICATIONS

Combined Search and Examination Report under Sections 17 and 18(3) for Application No. GB1904990.7 dated Oct. 9, 2019; 6 pgs.

(Continued)

*Primary Examiner* — John R Hardee
(74) *Attorney, Agent, or Firm* — Umberg Zipser LLP (57) ABSTRACT

The embodiments of the invention disclose a mixed refrigerant for a cryogenic temperature range, and methods for preparing and applying the same. The mixed refrigerant comprises six types of refrigerants: the first type of refrigerant is argon or nitrogen; the second type of refrigerant is methane or krypton; the third type of refrigerant is tetrafluoromethane; the fourth type of refrigerant is trifluoromethane or fluoromethane; the fifth type of refrigerant is at least one of 2,3,3,3☐tetrafluoro-1-propene, hexafluoropropylene, pentafluoropropene, and 1,3,3,3-tetrafluoro-1-propene; and the sixth type of refrigerant is at least one of 1,1,1,3,3-pentafluoropropane, 1,1,2,2,3-pentafluoropropane, monochloro-trifluoropropene, and hexafluoro-2-butene. The mixed refrigerant has the advantages of a low ODP value, a low GWP value and non-flammability, it achieves the beneficial effects of non-toxic, environmental-friendly, convenient and safe, and it is for large-scale industrial production applications.

9 Claims, 1 Drawing Sheet

(56) References Cited

FOREIGN PATENT DOCUMENTS

| | | | |
|---|---|---|---|
| CN | 102660229 A | * | 9/2012 |
| CN | 102719226 A | | 10/2012 |
| CN | 102660229 B | | 5/2014 |
| CN | 102719226 B | | 10/2015 |
| CN | 105586009 A | | 5/2016 |
| CN | 105885798 A | | 8/2016 |
| EP | 0516093 A1 | | 12/1992 |

OTHER PUBLICATIONS

First Office Action of Chinese Application No. 201810315387.8 dated Nov. 27, 2019; 12 pgs.

* cited by examiner

MIXED REFRIGERANT FOR A CRYOGENIC TEMPERATURE RANGE, AND METHODS FOR PREPARING AND APPLYING THE SAME

FIELD OF THE INVENTION

The present invention relates to the technical field of refrigeration systems, in particular to a mixed refrigerant for a cryogenic temperature range, and methods for preparing and applying the same.

BACKGROUND OF THE INVENTION

Refrigerant, also known as freezing medium, is a medium used in a refrigeration equipment to achieve energy conversion. In modern refrigeration equipment, it is usually necessary to use cascade refrigeration if a cryogenic temperature range of −100° C. to −150° C. is achieved by refrigeration using a compressor. Refrigerants used in existing automatic cascade cryogenic systems are typically obtained by mixing multiple refrigerants. To achieve a cryogenic temperature range of −100° C. to −150° C., a five-stage automatic cascade refrigeration system is generally employed, which uses a mixture of five or more refrigerants as a mixed refrigerant.

With the continuous improvement of environmental protection requirements, in the preparation of a mixed refrigerant, it is necessary to consider not only the flammability, boiling point and other parameters of each refrigerant component from the viewpoint of performance, but also the ozone depletion potential value (ODP value) and the global warming potential value (GWP value) of the refrigerant from the viewpoint of environmental protection. Especially with the increasingly strict environmental protection requirements for refrigerants in the EU and other regions, some refrigerants having a high GWP value will be gradually banned.

Therefore, in order to meet the environmental protection requirements to the greatest extent, there is an urgent need for an environmental-friendly mixed refrigerant having a low ODP value, a low GWP value and non-flammability.

BRIEF SUMMARY OF THE INVENTION

The embodiments of the present invention disclose a mixed refrigerant for a cryogenic temperature range, and methods for preparing and applying the same. The present invention can provide an environmental-friendly mixed refrigerant with an ODP value of 0, a low GWP value and non-flammability. The technical solutions are as follows.

In the first aspect, the embodiments of the present invention provide a mixed refrigerant for a cryogenic temperature range, comprising six types of refrigerants, wherein a first type of refrigerant is argon or nitrogen; a second type of refrigerant is methane or krypton; a third type of refrigerant is tetrafluoromethane; a fourth type of refrigerant is trifluoromethane or fluoromethane; a fifth type of refrigerant is at least one of 2,3,3,3-tetrafluoro-1-propene, hexafluoropropylene, pentafluoropropylene, and 1,3,3,3-tetrafluoro-1-propene; and a sixth type of refrigerant is at least one of 1,1,1,3,3-pentafluoropropane, 1,1,2,2,3-pentafluoropropane, monochloro-trifluoropropylene, and hexafluoro-2-butene, wherein the first type of refrigerant has a concentration of 0 mol % to 15 mol % in the mixed refrigerant;
the second type of refrigerant has a concentration of 0 mol % to 15 mol % in the mixed refrigerant;
the third type of refrigerant has a concentration of 15 mol % to 40 mol % in the mixed refrigerant;
the fourth type of refrigerant has a concentration of 15 mol % to 30 mol % in the mixed refrigerant;
the fifth type of refrigerant has a concentration of 8 mol % to 25 mol % in the mixed refrigerant; and
the sixth type of refrigerant has a concentration of 15 mol % to 30 mol % in the mixed refrigerant.

In the second aspect, the embodiments of the present invention further provide a method for preparing a mixed refrigerant, comprising: mixing a first type of refrigerant, a second type of refrigerant, a third type of refrigerant, a fourth type of refrigerant, a fifth type of refrigerant, and a sixth type of refrigerant at a normal temperature to obtain the mixed refrigerant, wherein the first type of refrigerant is argon or nitrogen; the second type of refrigerant is methane or krypton; the third type of refrigerant is tetrafluoromethane; the fourth type of refrigerant is trifluoromethane or fluoromethane; the fifth type of refrigerant is at least one of 2,3,3,3-tetrafluoro-1-propene, hexafluoropropylene, pentafluoropropylene, and 1,3,3,3-tetrafluoro-1-propene; and the sixth type of refrigerant is at least one of 1,1,1,3,3-pentafluoropropane, 1,1,2,2,3-pentafluoropropane, monochloro-trifluoropropylene, and hexafluoro-2-butene, wherein the first type of refrigerant has a concentration of 0 mol % to 15 mol % in the mixed refrigerant;
the second type of refrigerant has a concentration of 0 mol % to 15 mol % in the mixed refrigerant;
the third type of refrigerant has a concentration of 15 mol % to 40 mol % in the mixed refrigerant;
the fourth type of refrigerant has a concentration of 15 mol % to 30 mol % in the mixed refrigerant;
the fifth type of refrigerant has a concentration of 8 mol % to 25 mol % in the mixed refrigerant; and
the sixth type of refrigerant has a concentration of 15 mol % to 30 mol % in the mixed refrigerant.

In the third aspect, the embodiments of the present invention further provide a method for applying the mixed refrigerant of the first aspect or prepared by the method of the second aspect, comprising filling the mixed refrigerant to an automatic cascade refrigeration system.

The embodiments of the present invention provide a mixed refrigerant for a cryogenic temperature range, and methods for preparing and applying the same. By selecting argon or nitrogen as the first type of refrigerant, methane or krypton as the second type of refrigerant, tetrafluoromethane as the third type of refrigerant, trifluoromethane or fluoromethane as the fourth type of refrigerant, at least one of 2,3,3,3-tetrafluoro-1-propene, hexafluoropropylene, pentafluoropropylene, and 1,3,3,3-tetrafluoro-1-propene as the fifth type of refrigerant, and at least one of 1,1,1,3,3-pentafluoropropane, 1,1,2,2,3-pentafluoropropane, monochloro-trifluoropropylene, and hexafluoro-2-butene as the sixth type of refrigerant, the mixed refrigerant has a low ODP value, a low GWP value and non-flammability, and is non-toxic, environmental-friendly, convenient, safe, and for large-scale industrial production applications.

BRIEF DESCRIPTION OF THE SEVERAL VIEWS OF THE DRAWING

The drawing used in the examples or the description of the prior art will be briefly described below, for the purpose of illustrating the technical solutions in the examples of the present invention or in the prior art more clearly. It is obvious that the drawings in the following description are only a part of the examples of the present invention, and other drawings can be obtained by those skilled in the art based on these drawings without creative efforts.

DETAILED DESCRIPTION OF THE INVENTION

The technical solutions of the examples in the present invention will be described clearly and fully below with reference to the drawing of the examples of the present invention. It is obvious that the described examples are only a part and not all of the examples of the invention. All other examples obtained by those skilled in the art based on the examples of the present invention without creative efforts are fallen within the scope of the present invention.

Before the 21$^{st}$ century, traditional refrigeration systems used chlorine-containing refrigerants. Due to their destruction to the ozone layer, the European Union announced that it would be prohibited for the use of hydrochlorofluorocarbon (HCFC) in refrigeration systems from Jan. 1, 2001, which would be replaced by hydrofluorocarbon (HFC) refrigerants. However, with the development of the times, the ozone depletion potential (ODP) value and global warming potential (GWP) value of the working medium are required to be as low as possible to reduce the damage to the atmospheric ozone layer and to avoid global warming. Although these HFC refrigerants have an ODP value of 0, many of them, such as R134a (1,1,1,2-tetrafluoroethane), have a very high GWP value and are greenhouse gases that would be abandoned.

In the above, GWP refers to global warming potential, an index reflecting the greenhouse effect resulted from a substance, indicating that the relative effects of the substance in maintaining a comprehensive effect in the atmosphere at various periods of time and in absorbing exo-thermal-infrared radiation. The greenhouse effect of various greenhouse gases corresponds to the mass of carbon dioxide resulting in the same effect within 100 years.

The existing automatic cascade cryogenic systems suffer from the following defects:

1. The use of an automatic cascade refrigeration system having a temperature range of −100° C. to −150° C. is much more complicated than that of a conventional refrigeration system, since the automatic cascade refrigeration system generally requires a mixture of five or more refrigerants. It is required that the refrigerant is selected to be non-toxic with an ODP value of 0 and a low GWP value, as well as non-flammable. For example, an automatic cascade cryogenic equipment with 10 kW power uses 4 kilograms or more of refrigerant. It would be extremely dangerous to use a flammable and explosive refrigerant in an equipment, such as a vacuum coating equipment, in which glow discharge, high voltage and high current, and bare wiring are ever-present.

2. At a low temperature of −150° C., the lubricating oil of the compressor is solidified, and even many refrigerants are solidified. Therefore, it is required that several refrigerants are inter-miscible, and also inter-miscible with the compressor oil, so that they can work normally. Otherwise pipeline blockage, valve failure and other malfunctions will often occur. Most of the existing HFC refrigerants are used with polyester (POE) lubricating oil which is well inter-miscible with the refrigerants. Although the use of R170 can solve the problem of solidification of compressor oil, it is flammable, and cannot inter-miscible with R14. Therefore, R170 can only be partially added and cannot replace R23.

Therefore, for the mixed refrigerant, it should be considered not only the type and the physical property of each refrigerant, but also the fluidity at a low temperature and inter-miscibility with the lubricating oil in the automatic cascade refrigeration system of the refrigerant after mixing. More importantly, the environmental performance and safety performance of the mixed refrigerant need to be considered, so that the automatic cascade refrigeration system can operate efficiently and safely under the conditions that the mixed refrigerant meets environmental regulations.

Generally, refrigerants are divided into six categories: the first type of refrigerant with an evaporation temperature in the range of 30° C. to 0° C.: R141b (monofluoro-dichloroethane), R123 (trifluoro-dichloroethane), R124 (tetrafluoro-chloroethane), R245fa (pentafluoropropane), R236fa (hexafluoropropane), etc.; the second type of refrigerant with an evaporation temperature in the range of −20° C. to −50° C.: R290 (propane), R22 (difluoro-chloromethane), R125 (pentafluoroethane), R218 (octafluoropropane), R32 (difluoromethane), etc.; the third type of refrigerant with an evaporation temperature in the range of −75° C. to −95° C.: R23 (trifluoromethane), R170 (ethane), R116 (hexafluoroethane), R13 (trifluoro-chloromethane), R41 (fluoromethane), etc.; the fourth type of refrigerant with an evaporation temperature in the range of −125° C. to −135° C.: R14 (tetrafluoromethane), and NF3 (nitrogen trifluoride); the fifth type of refrigerant with an evaporation temperature in the range of −150° C. to −170° C.: R50 (methane) and krypton, etc.; and the sixth type of refrigerant with an evaporation temperature in the range of −180° C. to −200° C.: R740 (argon) and R744 (carbon dioxide), etc.

It can be seen from the above that there are few available refrigerants having an evaporation temperature below −120° C. The fifth and sixth types of refrigerants are refrigerants with an ODP value of 0 and a low GWP value. The fourth type of refrigerant can be selected from R14 and NF3, preferably R14, since the GWP value of NF3 (17200) is much higher than that of R14 (7390). For the third type of refrigerant, R13 has been eliminated because it is a CFC refrigerant and has a very high ODP value; R170 is flammable and is not inter-miscible with R14, which will cause a fluctuant and especially unstable operating pressure of the system; R116 has a slightly higher solidifying point and a comparative GWP value of 12200 comparing to R23; R41 has a very low GWP value and can be inter-miscible with R14, but it needs to be used in moderation due to its inflammability; and the remaining R23 is selectable, although it has a very high GWP value of 14800, it can be mixed with R41 to reduce the total value of GWP, or can be used alone.

If a lower GWP value is expected by mixing the refrigerants, it is necessary to make a reasonable selection in the first and second types of refrigerants, and obtain a reasonable concentration ratio of the selected six types of refrigerants. The embodiments of the present invention provide a mixed refrigerant for a cryogenic temperature range, comprising six types of refrigerants, wherein the first type of refrigerant is R740 (argon) or R728 (nitrogen);

the second type of refrigerant is R50 (methane) or R784 (krypton);

the third type of refrigerant is R14 (tetrafluoromethane);

the fourth type of refrigerant is R23 (trifluoromethane) or R41 (fluoromethane);

the fifth type of refrigerant is at least one of HFO-1234yf (2,3,3,3-tetrafluoro-1-propene), HFO-1216 (hexafluoropropylene), HFO-1225 (pentafluoropropylene), and HFO-1234ze (1,3,3,3-tetrafluoro-1-propene); and the sixth type of refrigerant is at least one of HFC245fa (1,1,1,3,3-pentafluoropropane), HFC-245ca (1,1,2,2,3-pentafluoropropane), HCFO-1233zd (monochloro-trifluoropropylene), and HFO-1336mmz (hexafluoro-2-butene).

The inventor has found that when the six types of refrigerants above are mixed according to the ratio below, the obtained mixed refrigerant has an ODP value of 0, a low GWP value, and is non-flammable and inter-miscible with lubricating oil in an automatic cascade refrigeration system.

The specific ratio is as follows:

the amount of substance concentration of the first type of refrigerant in the mixed refrigerant is 0 mol % to 15 mol %;

the concentration of the second type of refrigerant in the mixed refrigerant is 0 mol % to 15 mol %;

the concentration of the third type of refrigerant in the mixed refrigerant is 15 mol % to 40 mol %;

the concentration of the fourth type of refrigerant in the mixed refrigerant is 15 mol % to 30 mol %;

the concentration of the fifth type of refrigerant in the mixed refrigerant is 8 mol % to 25 mol %; and the concentration of the sixth type of refrigerant in the mixed refrigerant is 15 mol % to 30 mol %;

wherein, the sum of the concentration of the six types of refrigerants above in the mixed refrigerant is 100 mol %.

The mixed refrigerant of the embodiments of the present invention has the following advantages over the existing mixed refrigerant.

1. Compliance with Strict Environmental-Protection Requirements

The mixed refrigerant of the present invention has an ODP value of 0. Although R14 and R23 have a high GWP value, they are not restricted for use because of their irreplaceable particularity. Other refrigerants have a GWP value lower than 1200, which enables superior environmental-friendly performance of the mixed refrigerant in the embodiments of the present invention.

2. Good Fluidity at a Low Temperature

Due to the use of HFC refrigerants, most of the compressor oils employ POE lubricating oil. The mixed refrigerant of the present invention has good inter-miscibility with POE lubricating oil, and thus it will not cause oil solidification and wax plugging phenomenon when flowing through a capillary tube or an expansion valve throttle device at a low temperature. The solidification temperature of the mixed refrigerant is lower than −150° C.

3. Non-Flammability and Safety

Except for R50 and R41, other refrigerants are non-flammable, non-toxic and non-explosive. The risk factor will be extremely low, as long as R50 and R41 are controlled to a low proportion in the refrigerant. In the present invention, the proportion of R50 and R41 are relatively low. Of course, it is also possible not to use these two refrigerants or to use non-flammable R784 instead of R50.

HFO-1234yf (2,3,3,3-tetrafluoro-1-propene) and HFO-1234ze (1,3,3,3-tetrafluoro-1-propene) are slightly flammable. The toxicity and flammability of HFO-1234yf are also extensively tested by the international authoritative independent laboratory, International Society of Automated Engineers, and global experts are organized for in-depth evaluation. It is finally concluded that although HFO-1234yf has a low flammability, it can be ignited only in the presence of gasoline (having flammability similar to HFC-134a), and thus HFO-1234yf is safe.

When the mixed refrigerant above is applied to different cryogenic temperature ranges, the mixed refrigerant can be more for application to different cryogenic temperature ranges by adjusting the concentration of various refrigerants.

Specifically, the concentration of the first type of refrigerant in the mixed refrigerant is 0 mol % to 5 mol %;

the concentration of the second type of refrigerant in the mixed refrigerant is 5 mol % to 10 mol %;

the concentration of the third type of refrigerant in the mixed refrigerant is 25 mol % to 30 mol %;

the concentration of the fourth type of refrigerant in the mixed refrigerant is 25 mol % to 30 mol %;

the concentration of the fifth type of refrigerant in the mixed refrigerant is 15 mol % to 20 mol %; and the concentration of the sixth type of refrigerant in the mixed refrigerant is 20 mol % to 30 mol %.

The formulated mixed refrigerant is for a cryogenic temperature range of −100° C. to −105° C.

The concentration of the first type of refrigerant in the mixed refrigerant is 5 mol % to 10 mol %;

the concentration of the second type of refrigerant in the mixed refrigerant is 0 mol % to 5 mol %;

the concentration of the third type of refrigerant in the mixed refrigerant is 20 mol % to 30 mol %;

the concentration of the fourth type of refrigerant in the mixed refrigerant is 15 mol % to 20 mol %;

the concentration of the fifth type of refrigerant in the mixed refrigerant is 20 mol % to 25 mol %; and the concentration of the sixth type of refrigerant in the mixed refrigerant is 20 mol % to 30 mol %.

The formulated mixed refrigerant is for a cryogenic temperature range of −105° C. to −115° C.

The concentration of the first type of refrigerant in the mixed refrigerant is 5 mol % to 10 mol %;

the concentration of the second type of refrigerant in the mixed refrigerant is 0 mol % to 5 mol %;

the concentration of the third type of refrigerant in the mixed refrigerant is 15 mol % to 25 mol %;

the concentration of the fourth type of refrigerant in the mixed refrigerant is 15 mol % to 20 mol %;

the concentration of the fifth type of refrigerant in the mixed refrigerant is 15 mol % to 25 mol %; and the concentration of the sixth type of refrigerant in the mixed refrigerant is 20 mol % to 30 mol %.

The formulated mixed refrigerant is for a cryogenic temperature range of −115° C. to −125° C.

The concentration of the first type of refrigerant in the mixed refrigerant is 5 mol % to 10 mol %;

the concentration of the second type of refrigerant in the mixed refrigerant is 2 mol % to 10 mol %;

the concentration of the third type of refrigerant in the mixed refrigerant is 25 mol % to 30 mol %;

the concentration of the fourth type of refrigerant in the mixed refrigerant is 15 mol % to 20 mol %;

the concentration of the fifth type of refrigerant in the mixed refrigerant is 15 mol % to 20 mol %; and the concentration of the sixth type of refrigerant in the mixed refrigerant is 15 mol % to 25 mol %.

The formulated mixed refrigerant is for a cryogenic temperature range of −125° C. to −135° C.

The concentration of the first type of refrigerant in the mixed refrigerant is 10 mol % to 15 mol %;

the concentration of the second type of refrigerant in the mixed refrigerant is 2 mol % to 5 mol %;
the concentration of the third type of refrigerant in the mixed refrigerant is 20 mol % to 25 mol %;
the concentration of the fourth type of refrigerant in the mixed refrigerant is 15 mol % to 20 mol %;
the concentration of the fifth type of refrigerant in the mixed refrigerant is 15 mol % to 25 mol %; and
the concentration of the sixth type of refrigerant in the mixed refrigerant is 20 mol % to 30 mol %.

The formulated mixed refrigerant is for a cryogenic temperature range of −135° C. to −145° C.

The concentration of the first type of refrigerant in the mixed refrigerant is 10 mol % to 15 mol %;
the concentration of the second type of refrigerant in the mixed refrigerant is 2 mol % to 5 mol %;
the concentration of the third type of refrigerant in the mixed refrigerant is 20 mol % to 25 mol %;
the concentration of the fourth type of refrigerant in the mixed refrigerant is 15 mol % to 25 mol %;
the concentration of the fifth type of refrigerant in the mixed refrigerant is 10 mol % to 15 mol %; and
the concentration of the sixth type of refrigerant in the mixed refrigerant is 20 mol % to 30 mol %.

The formulated mixed refrigerant is for a cryogenic temperature range of −145° C. to −150° C.

The embodiments of the present invention provide a mixed refrigerant for a cryogenic temperature range, which can be applied to a cryogenic temperature in a range of −100° C. to −150° C. and enables normal and efficient operation of the automatic cascade refrigeration system. The mixed refrigerant has the advantages of a low ODP value, a low GWP value and non-flammability, and is non-toxic, environmental-friendly, convenient, safe, and for large-scale industrial production applications.

Accordingly, the embodiments of the present invention further provide a method for preparing the mixed refrigerant above, comprising:

mixing the first type of refrigerant, the second type of refrigerant, the third type of refrigerant, the fourth type of refrigerant, the fifth type of refrigerant, and the sixth type of refrigerant at a normal temperature to obtain a mixed refrigerant. In the method, the first type of refrigerant is R740 (argon) or R-728 (nitrogen); the second type of refrigerant is R-50 (methane) or R-784 (krypton); the third type of refrigerant is R14 (tetrafluoromethane); the fourth type of refrigerant is R23 (trifluoromethane) or R41 (fluoromethane); the fifth type of refrigerant is at least one of HFO-1234yf (2,3,3,3-tetrafluoro-1-propene), HFO-1216 (hexafluoropropylene), HFO-1225 (pentafluoropropylene), and HFO-1234ze (1,3,3,3-tetrafluoro-1-propene); and the sixth type of refrigerant is at least one of HFC245fa (1,1,1,3,3-pentafluoropropane), HFC245ca (1,1,2,2,3-pentafluoropropane), HCFO-1233zd (monochloro-trifluoropropene), and HFO-1336mmz (hexafluoro-2-butene).

In the method, the concentration of the first type of refrigerant in the mixed refrigerant is 0 mol % to 15 mol %;
the concentration of the second type of refrigerant in the mixed refrigerant is 0 mol % to 15 mol %;
the concentration of the third type of refrigerant in the mixed refrigerant is 15 mol % to 40 mol %;
the concentration of the fourth type of refrigerant in the mixed refrigerant is 15 mol % to 30 mol %;
the concentration of the fifth type of refrigerant in the mixed refrigerant is 8 mol % to 25 mol %; and
the concentration of the sixth type of refrigerant in the mixed refrigerant is 15 mol % to 30 mol %.

In the method above, "normal temperature" refers to room temperature, typically refers to 25° C.

In general, with the increase of the amount of refrigerant having a high boiling point, the operating pressure of the compressor decreases and the temperature inside the evaporator rises. Conversely, with the increase of the proportion of refrigerant having a low boiling point, the operating pressure of the compressor rises and the temperature inside the evaporator decreases. The operating pressure of the compressor (absolute pressure) is generally between 10 bars and 18 bars for high pressure, and between 1.5 bars and 4 bars for low pressure. It can be adjusted according to the actual operating conditions.

In the present invention, the mixed refrigerant can be obtained by physically mixing the six types of refrigerants at a normal temperature according to the ratio. A system temperature of −100° C. to −150° C. can be achieved by using the mixed refrigerant in a five-stage automatic cascade system. All refrigerants are inter-miscible, well inter-miscible with lubricating oil in the system, and have an ODP value of 0 and a low GWP value. The refrigerants meet the requirements of non-toxic, environmental-friendly, convenient, safe and non-flammable.

The method for preparing a mixed refrigerant for a cryogenic temperature range provided by the embodiments of the present invention only needs to mix various types of refrigerants with reasonably adjusting the ratio of the first type of refrigerant, the second type of refrigerant, the third type of refrigerant, the fourth type of refrigerant, the fifth type of refrigerant and the sixth type of refrigerant, and thus has a beneficial effect of simple preparation.

Accordingly, the embodiments of the present invention further provide a method for applying the mixed refrigerant above, comprising: filling the mixed refrigerant above into an automatic cascade refrigeration system.

Figure 1:
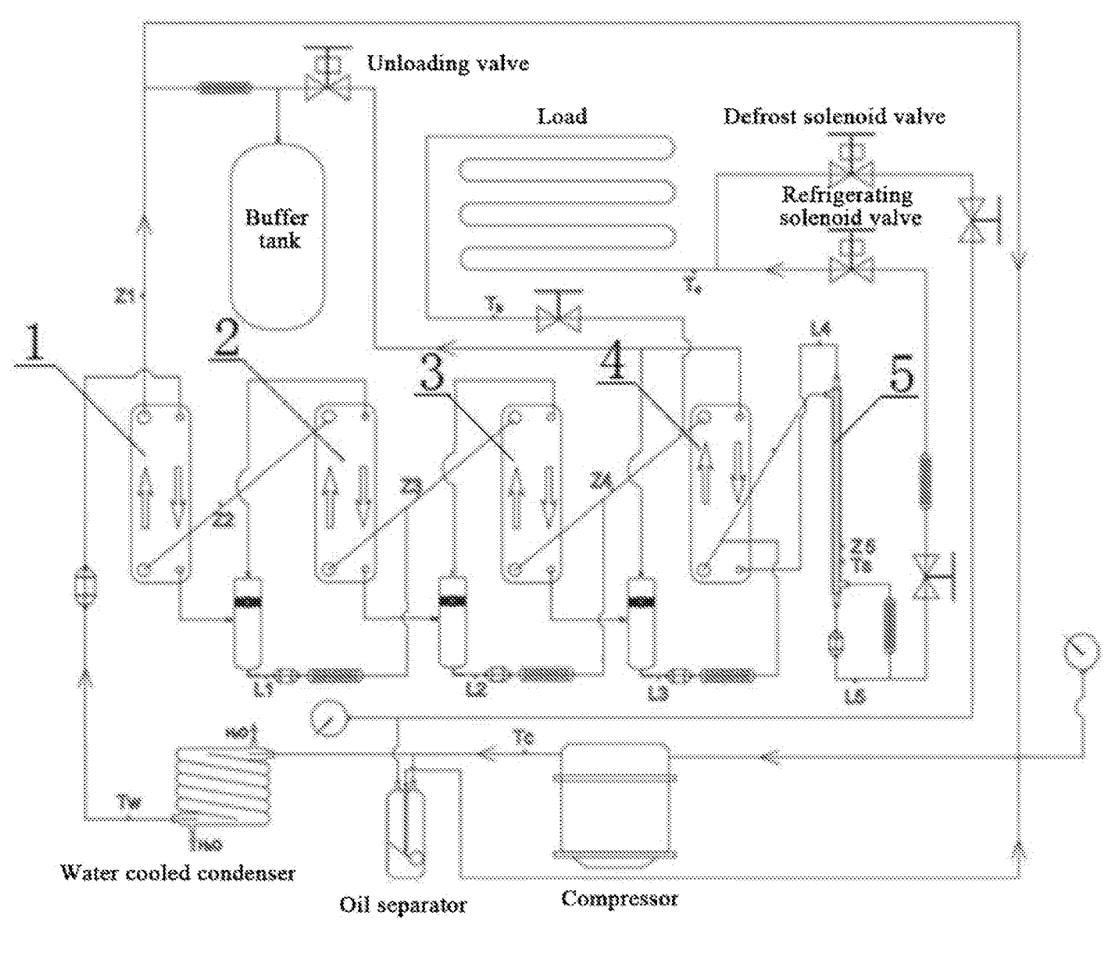
FIG. 1 is a structural schematic drawing of a single-machine automatic cascade refrigeration system with five stages, in which the mixed refrigerant of the present invention is applied.

FIG. 1 shows a structural schematic drawing of a single-machine automatic cascade refrigeration system with five stages, in which the mixed refrigerant of the present invention is applied. In the FIGURE, the mixed refrigerant exchanges heat in the first heat exchanger 1, the second heat exchanger 2, the third heat exchanger 3, the fourth heat exchanger 4, and the fifth heat exchanger 5, and enables the single-machine automatic cascade refrigeration system with five stages to reach a cryogenic temperature range of −100° C. to −150° C. while ensuring normal lubrication and safe operation of the refrigeration system.

The technical solutions of the present invention will be described below with reference to specific examples. The described examples are only a part and not all of the examples of the invention. All other examples obtained by those skilled in the art based on the examples of the present invention without creative efforts are fallen within the scope of the present invention.

EXAMPLE 1

An environmental-friendly mixed refrigerant used at −100° C. was formulated, and the concentration of each type of refrigerant is as follows.

The second type of refrigerant: R-50 has a concentration of 5 mol % in the mixed refrigerant; the third type of refrigerant: R14 has a concentration of 25 mol % in the mixed refrigerant; the fourth type of refrigerant: R23 has a concentration of 25 mol % in the mixed refrigerant; the fifth type of refrigerant: HFO-1234fa has a concentration of 15 mol % in the mixed refrigerant; and the sixth type of refrigerant: HFO-1336 mmz has a concentration of 10 mol % in the mixed refrigerant, and HFC-245fa has a concentration of 20 mol % in the mixed refrigerant.

The operating parameters of the refrigerant are: condensing temperature of 25° C., refrigeration temperature of −100° C., discharge pressure of the compressor of 210 psi, and low pressure of 25 psi.

EXAMPLE 2

An environmental-friendly mixed refrigerant used at −100° C. was formulated, and the concentration of each type of refrigerant is as follows.

The second type of refrigerant: R-50 has a concentration of 5 mol % in the mixed refrigerant; the third type of refrigerant: R14 has a concentration of 30 mol % in the mixed refrigerant; the fourth type of refrigerant: R23 has a concentration of 30 mol % in the mixed refrigerant; the fifth type of refrigerant: HFO-1234fa has a concentration of 15 mol % in the mixed refrigerant; and the sixth type of refrigerant: HFO-1336mmz has a concentration of 10 mol % in the mixed refrigerant, and HFC-245fa has a concentration of 10 mol % in the mixed refrigerant.

The operating parameters of the refrigerant are: condensing temperature of 25° C., refrigeration temperature of −100° C., discharge pressure of the compressor of 210 psi, and low pressure of 25 psi.

EXAMPLE 3

An environmental-friendly mixed refrigerant used at −102° C. was formulated, and the concentration of each type of refrigerant is as follows.

The first type of refrigerant: R740 has a concentration of 2 mol % in the mixed refrigerant; the second type of refrigerant: R-50 has a concentration of 6 mol % in the mixed refrigerant; the third type of refrigerant: R14 has a concentration of 27 mol % in the mixed refrigerant; the fourth type of refrigerant: R23 has a concentration of 28 mol % in the mixed refrigerant; the fifth type of refrigerant: HFO-1234fa has a concentration of 17 mol % in the mixed refrigerant; and the sixth type of refrigerant: HFO-1336mmz has a concentration of 10 mol % in the mixed refrigerant, and HFC-245fa has a concentration of 10 mol % in the mixed refrigerant.

The operating parameters of the refrigerant are: condensing temperature of 25° C., refrigeration temperature of −100° C., discharge pressure of the compressor of 210 psi, and low pressure of 25 psi.

EXAMPLE 4

An environmental-friendly mixed refrigerant used at −105° C. was formulated, and the concentration of each type of refrigerant is as follows.

The first type of refrigerant: R740 has a concentration of 5 mol % in the mixed refrigerant; the second type of refrigerant: R-50 has a concentration of 10 mol % in the mixed refrigerant; the third type of refrigerant: R14 has a concentration of 25 mol % in the mixed refrigerant; the fourth type of refrigerant: R23 has a concentration of 25 mol % in the mixed refrigerant; the fifth type of refrigerant: HFO-1234fa has a concentration of 20 mol % in the mixed refrigerant; and the sixth type of refrigerant: HFO-1336 mmz has a concentration of 10 mol % in the mixed refrigerant, and HFC-245fa has a concentration of 5 mol % in the mixed refrigerant. The operating parameters of the refrigerant are: condensing temperature of 25° C., refrigeration temperature of −100° C., discharge pressure of the compressor of 210 psi, and low pressure of 25 psi.

EXAMPLE 5

An environmental-friendly mixed refrigerant used at −105° C. was formulated, and the concentration of each type of refrigerant is as follows.

The first type of refrigerant: R740 has a concentration of 5 mol % in the mixed refrigerant; the second type of refrigerant: R-50 has a concentration of 0 mol % in the mixed refrigerant; the third type of refrigerant: R14 has a concentration of 25 mol % in the mixed refrigerant; the fourth type of refrigerant: R23 has a concentration of 20 mol % in the mixed refrigerant; the fifth type of refrigerant: HFO-1216 has a concentration of 15 mol % in the mixed refrigerant, and HFO-1234yf has a concentration of 10 mol % in the mixed refrigerant; and the sixth type of refrigerant: HCFO-1233zd has a concentration of 15 mol % in the mixed refrigerant, and HFO-1336mmz has a concentration of 10 mol % in the mixed refrigerant.

The operating parameters are: condensing temperature of 25° C., refrigeration temperature of −110° C., discharge pressure of the compressor of 230 psi, and low pressure of 28 psi.

EXAMPLE 6

An environmental-friendly mixed refrigerant used at −110° C. was formulated, and the concentration of each type of refrigerant is as follows.

The first type of refrigerant: R740 has a concentration of 10 mol % in the mixed refrigerant; the second type of refrigerant: R-50 has a concentration of 5 mol % in the mixed refrigerant; the third type of refrigerant: R14 has a concentration of 30 mol % in the mixed refrigerant; the fourth type of refrigerant: R23 has a concentration of 15 mol % in the mixed refrigerant; the fifth type of refrigerant: HFO-1216 has a concentration of 10 mol % in the mixed refrigerant, and HFO-1234yf has a concentration of 10 mol % in the mixed refrigerant; and the sixth type of refrigerant: HCFO-1233zd has a concentration of 10 mol % in the mixed refrigerant, and HFO-1336mmz has a concentration of 10 mol % in the mixed refrigerant.

The operating parameters are: condensing temperature of 25° C., refrigeration temperature of −110° C., discharge pressure of the compressor of 230 psi, and low pressure of 28 psi.

EXAMPLE 7

An environmental-friendly mixed refrigerant used at −115° C. was formulated, and the concentration of each type of refrigerant is as follows.

The first type of refrigerant: R740 has a concentration of 7 mol % in the mixed refrigerant; the second type of refrigerant: R-50 has a concentration of 3 mol % in the mixed refrigerant; the third type of refrigerant: R14 has a concentration of 20 mol % in the mixed refrigerant; the fourth type of refrigerant: R23 has a concentration of 17 mol % in the mixed refrigerant; the fifth type of refrigerant: HFO-1216 has a concentration of 10 mol % in the mixed refrigerant, and HFO-1234yf has a concentration of 13 mol % in the mixed refrigerant; and the sixth type of refrigerant: HCFO-1233zd has a concentration of 15 mol % in the mixed refrigerant, and HFO-1336mmz has a concentration of 15 mol % in the mixed refrigerant.

The operating parameters are: condensing temperature of 25° C., refrigeration temperature of −110° C., discharge pressure of the compressor of 230 psi, and low pressure of 28 psi.

EXAMPLE 8

An environmental-friendly mixed refrigerant used at −115° C. was formulated, and the concentration of each type of refrigerant is as follows.

The first type of refrigerant: R740 has a concentration of 8 mol % in the mixed refrigerant; the second type of refrigerant: R-784 has a concentration of 2 mol % in the mixed refrigerant; the third type of refrigerant: R14 has a concentration of 20 mol % in the mixed refrigerant; the fourth type of refrigerant: R23 has a concentration of 10 mol % in the mixed refrigerant, and HFC-41 has a concentration of 10 mol % in the mixed refrigerant; the fifth type of refrigerant: HFO-1234yf has a concentration of 15 mol % in the mixed refrigerant, and HFO-1225 has a concentration of 10 mol % in the mixed refrigerant; and the sixth type of refrigerant: HFC245ca has a concentration of 5 mol % in the mixed refrigerant, HCFO-1233zd has a concentration of 10 mol % in the mixed refrigerant, and HFO-1336mmz (hexafluoro-2-butene) has a concentration of 10 mol % in the mixed refrigerant.

The operating parameters are: condensing temperature of 25° C., refrigeration temperature of −120° C., discharge pressure of the compressor of 240 psi, and low pressure of 26 psi.

EXAMPLE 9

An environmental-friendly mixed refrigerant used at −120° C. was formulated, and the concentration of each type of refrigerant is as follows.

The first type of refrigerant: R740 has a concentration of 5 mol % in the mixed refrigerant; the second type of refrigerant: R-784 has a concentration of 5 mol % in the mixed refrigerant; the third type of refrigerant: R14 has a concentration of 25 mol % in the mixed refrigerant; the fourth type of refrigerant: R23 has a concentration of 10 mol % in the mixed refrigerant, and HFC-41 has a concentration of 7 mol % in the mixed refrigerant; the fifth type of refrigerant: HFO-1234yf has a concentration of 10 mol % in the mixed refrigerant, and HFO-1225 has a concentration of 8 mol % in the mixed refrigerant; and the sixth type of refrigerant: HFC245ca has a concentration of 10 mol % in the mixed refrigerant, HCFO-1233zd has a concentration of 10 mol % in the mixed refrigerant, and HFO-1336mmz (hexafluoro-2-butene) has a concentration of 10 mol % in the mixed refrigerant.

The operating parameters are: condensing temperature of 25° C., refrigeration temperature of −120° C., discharge pressure of the compressor of 240 psi, and low pressure of 26 psi.

EXAMPLE 10

An environmental-friendly mixed refrigerant used at −125° C. was formulated, and the concentration of each type of refrigerant is as follows.

The first type of refrigerant: R740 has a concentration of 10 mol % in the mixed refrigerant; the second type of refrigerant: R-784 has a concentration of 0 mol % in the mixed refrigerant; the third type of refrigerant: R14 has a concentration of 25 mol % in the mixed refrigerant; the fourth type of refrigerant: R23 has a concentration of 10 mol % in the mixed refrigerant, and HFC-41 has a concentration of 10 mol % in the mixed refrigerant; the fifth type of refrigerant: HFO-1234yf has a concentration of 15 mol % in the mixed refrigerant, and HFO-1225 has a concentration of 10 mol % in the mixed refrigerant; and the sixth type of refrigerant: HFC245ca has a concentration of 5 mol % in the mixed refrigerant, HCFO-1233zd has a concentration of 5 mol % in the mixed refrigerant, and HFO-1336mmz (hexafluoro-2-butene) has a concentration of 10 mol % in the mixed refrigerant.

The operating parameters are: condensing temperature of 25° C., refrigeration temperature of −120° C., discharge pressure of the compressor of 240 psi, and low pressure of 26 psi.

EXAMPLE 11

An environmental-friendly mixed refrigerant used at −125° C. was formulated, and the concentration of each type of refrigerant is as follows.

The first type of refrigerant: R740 has a concentration of 5 mol % in the mixed refrigerant, and R728 has a concentration of 5 mol % in the mixed refrigerant; the second type of refrigerant: R-50 has a concentration of 5 mol % in the mixed refrigerant; the third type of refrigerant: R14 has a concentration of 30 mol % in the mixed refrigerant; the fourth type of refrigerant: R23 has a concentration of 10 mol % in the mixed refrigerant, and HFC-41 has a concentration of 5 mol % in the mixed refrigerant; the fifth type of refrigerant: HFO-1234yf has a concentration of 15 mol % in the mixed refrigerant, and HFO-1234ze has a concentration of 5 mol % in the mixed refrigerant; and the sixth type of refrigerant: HFC245ca has a concentration of 5 mol % in the mixed refrigerant, HFC245fa has an concentration of 10 mol % in the mixed refrigerant, and HFO-1336mmz has a concentration of 5 mol % in the mixed refrigerant.

The operating parameters are: condensing temperature of 25° C., refrigeration temperature of −130° C., discharge pressure of the compressor of 250 psi, and low pressure of 28 psi.

EXAMPLE 12

An environmental-friendly mixed refrigerant used at −130° C. was formulated, and the concentration of each type of refrigerant is as follows.

The first type of refrigerant: R740 has a concentration of 3 mol % in the mixed refrigerant, and R728 has an amount of substance concentration of 5 mol % in the mixed refrigerant; the second type of refrigerant: R-50 has a concentration of 2 mol % in the mixed refrigerant; the third type of refrigerant: R14 has a concentration of 28 mol % in the mixed refrigerant; the fourth type of refrigerant: R23 has a concentration of 10 mol % in the mixed refrigerant, and HFC-41 has a concentration of 10 mol % in the mixed refrigerant; the fifth type of refrigerant: HFO-1234yf has a concentration of 15 mol % in the mixed refrigerant, and HFO-1234ze has a concentration of 2 mol % in the mixed refrigerant; and the sixth type of refrigerant: HFC245ca has an amount of substance concentration of 5 mol % in the mixed refrigerant, HFC245fa has a concentration of 10 mol % in the mixed refrigerant, and HFO-1336mmz has a concentration of 10 mol % in the mixed refrigerant.

The operating parameters are: condensing temperature of 25° C., refrigeration temperature of −130° C., discharge pressure of the compressor of 250 psi, and low pressure of 28 psi.

EXAMPLE 13

An environmental-friendly mixed refrigerant used at −130° C. was formulated, and the concentration of each type of refrigerant is as follows.

The first type of refrigerant: R740 has a concentration of 3 mol % in the mixed refrigerant, and R728 has a concentration of 2 mol % in the mixed refrigerant; the second type of refrigerant: R-50 has a concentration of 10 mol % in the mixed refrigerant; the third type of refrigerant: R14 has a concentration of 30 mol % in the mixed refrigerant; the fourth type of refrigerant: R23 has a concentration of 10 mol % in the mixed refrigerant, and HFC-41 has a concentration of 8 mol % in the mixed refrigerant; the fifth type of refrigerant: HFO-1234yf has a concentration of 10 mol % in the mixed refrigerant, and HFO-1234ze has a concentration of 5 mol % in the mixed refrigerant; and the sixth type of refrigerant: HFC245ca has a concentration of 7 mol % in the mixed refrigerant, HFC245fa has a concentration of 10 mol % in the mixed refrigerant, and HFO-1336mmz has a concentration of 5 mol % in the mixed refrigerant.

The operating parameters are: condensing temperature of 25° C., refrigeration temperature of −130° C., discharge pressure of the compressor of 250 psi, and low pressure of 28 psi.

EXAMPLE 14

An environmental-friendly mixed refrigerant used at −135° C. was formulated, and the amount-of-substance concentration of each type of refrigerant is as follows.

The first type of refrigerant: R740 has a concentration of 5 mol % in the mixed refrigerant, and R728 has an amount of substance concentration of 5 mol % in the mixed refrigerant; the second type of refrigerant: R-50 has a concentration of 10 mol % in the mixed refrigerant; the third type of refrigerant: R14 has a concentration of 25 mol % in the mixed refrigerant; the fourth type of refrigerant: R23 has a concentration of 10 mol % in the mixed refrigerant, and HFC-41 has a concentration of 10 mol % in the mixed refrigerant; the fifth type of refrigerant: HFO-1234yf has a concentration of 15 mol % in the mixed refrigerant, and HFO-1234ze has an amount of substance concentration of 5 mol % in the mixed refrigerant; and the sixth type of refrigerant: HFC245ca has a concentration of 5 mol % in the mixed refrigerant, HFC245fa has a concentration of 5 mol % in the mixed refrigerant, and HFO-1336mmz has a concentration of 5 mol % in the mixed refrigerant.

The operating parameters are: condensing temperature of 25° C., refrigeration temperature of −130° C., discharge pressure of the compressor of 250 psi, and low pressure of 28 psi.

EXAMPLE 15

An environmental-friendly mixed refrigerant used at −135° C. was formulated, and the concentration of each type of refrigerant is as follows.

The first type of refrigerant: R740 has a concentration of 8 mol % in the mixed refrigerant, and R728 has a concentration of 5 mol % in the mixed refrigerant; the second type of refrigerant: R-50 has a concentration of 5 mol % in the mixed refrigerant; the third type of refrigerant: R14 has a concentration of 22 mol % in the mixed refrigerant; the fourth type of refrigerant: R23 has a concentration of 10 mol % in the mixed refrigerant, and HFC-41 has a concentration of 5 mol % in the mixed refrigerant; the fifth type of refrigerant: HFO-1225 has a concentration of 20 mol % in the mixed refrigerant; and the sixth type of refrigerant: HFO-1336mmz has a concentration of 25 mol % in the mixed refrigerant.

The operating parameters are: condensing temperature of 25° C., refrigeration temperature of −140° C., discharge pressure of the compressor of 260 psi, and low pressure of 30 psi.

EXAMPLE 16

An environmental-friendly mixed refrigerant used at −140° C. was formulated, and the concentration of each type of refrigerant is as follows:

The first type of refrigerant: R740 has a concentration of 5 mol % in the mixed refrigerant, and R728 has a concentration of 5 mol % in the mixed refrigerant; the second type of refrigerant: R-50 has a concentration of 3 mol % in the mixed refrigerant; the third type of refrigerant: R14 has a concentration of 25 mol % in the mixed refrigerant; the fourth type of refrigerant: R23 has a concentration of 10 mol % in the mixed refrigerant, and HFC-41 has a concentration of 7 mol % in the mixed refrigerant; the fifth type of refrigerant: HFO-1225 has a concentration of 15 mol % in the mixed refrigerant; and the sixth type of refrigerant: HFO-1336mmz has a concentration of 30 mol % in the mixed refrigerant.

The operating parameters are: condensing temperature of 25° C., refrigeration temperature of −140° C., discharge pressure of the compressor of 260 psi, and low pressure of 30 psi.

EXAMPLE 17

An environmental-friendly mixed refrigerant used at −140° C. was formulated, and the concentration of each type of refrigerant is as follows.

The first type of refrigerant: R740 has a concentration of 8 mol % in the mixed refrigerant, and R728 has a concentration of 7 mol % in the mixed refrigerant; the second type of refrigerant: R-50 has a concentration of 2 mol % in the mixed refrigerant; the third type of refrigerant: R14 has a concentration of 20 mol % in the mixed refrigerant; the fourth type of refrigerant: R23 has a concentration of 10 mol % in the mixed refrigerant, and HFC-41 has a concentration of 8 mol % in the mixed refrigerant; the fifth type of refrigerant: HFO-1225 has a concentration of 25 mol % in the mixed refrigerant; and the sixth type of refrigerant: HFO-1336mmz has a concentration of 20 mol % in the mixed refrigerant.

The operating parameters are: condensing temperature of 25° C., refrigeration temperature of −140° C., discharge pressure of the compressor of 260 psi, and low pressure of 30 psi.

EXAMPLE 18

An environmental-friendly mixed refrigerant used at −145° C. was formulated, and the concentration of each type of refrigerant is as follows.

The first type of refrigerant: R740 has a concentration of 5 mol % in the mixed refrigerant, and R728 has a concentration of 5 mol % in the mixed refrigerant; the second type of refrigerant: R-50 has a concentration of 5 mol % in the mixed refrigerant; the third type of refrigerant: R14 has a concentration of 20 mol % in the mixed refrigerant; the fourth type of refrigerant: R23 has a concentration of 10 mol % in the mixed refrigerant, and HFC-41 has a concentration of 10 mol % in the mixed refrigerant; the fifth type of refrigerant: HFO-1225 has a concentration of 20 mol % in the mixed refrigerant; and the sixth type of refrigerant: HFO-1336mmz has a concentration of 25 mol % in the mixed refrigerant.

The operating parameters are: condensing temperature of 25° C., refrigeration temperature of −140° C., discharge pressure of the compressor of 260 psi, and low pressure of 30 psi.

EXAMPLE 19

An environmental-friendly mixed refrigerant used at −145° C. was formulated, and the concentration of each type of refrigerant is as follows.

The first type of refrigerant: R740 has a concentration of 5 mol % in the mixed refrigerant, and R728 has a concentration of 8 mol % in the mixed refrigerant; the second type of refrigerant: R-784 has a concentration of 5 mol % in the mixed refrigerant; the third type of refrigerant: R14 has a concentration of 22 mol % in the mixed refrigerant; the fourth type of refrigerant: R23 has a concentration of 15 mol % in the mixed refrigerant, and HFC-41 has a concentration of 5 mol % in the mixed refrigerant; the fifth type of refrigerant: HFO-1234yf has a concentration of 10 mol % in the mixed refrigerant; and the sixth type of refrigerant: HFC245fa has a concentration of 30 mol % in the mixed refrigerant.

The operating parameters are: condensing temperature of 25° C., refrigeration temperature of −150° C., discharge pressure of the compressor of 280 psi, and low pressure of 32 psi.

EXAMPLE 20

An environmental-friendly mixed refrigerant used at −148° C. was formulated, and the concentration of each type of refrigerant is as follows.

The first type of refrigerant: R740 has a concentration of 5 mol % in the mixed refrigerant, and R728 has a concentration of 10 mol % in the mixed refrigerant; the second type of refrigerant: R-784 has a concentration of 3 mol % in the mixed refrigerant; the third type of refrigerant: R14 has a concentration of 25 mol % in the mixed refrigerant; the fourth type of refrigerant: R23 has a concentration of 15 mol % in the mixed refrigerant, and HFC-41 has a concentration of 10 mol % in the mixed refrigerant; the fifth type of refrigerant: HFO-1234yf has a concentration of 12 mol % in the mixed refrigerant; and the sixth type of refrigerant: HFC245fa has a concentration of 20 mol % in the mixed refrigerant.

The operating parameters are: condensing temperature of 25° C., refrigeration temperature of −150° C., discharge pressure of the compressor of 280 psi, and low pressure of 32 psi.

EXAMPLE 21

An environmental-friendly mixed refrigerant used at −150° C. was formulated, and the amount of substance concentration of each type of refrigerant is as follows.

The first type of refrigerant: R740 has a concentration of 5 mol % in the mixed refrigerant, and R728 has a concentration of 5 mol % in the mixed refrigerant; the second type of refrigerant: R-784 has a concentration of 2 mol % in the mixed refrigerant; the third type of refrigerant: R14 has a concentration of 20 mol % in the mixed refrigerant; the fourth type of refrigerant: R23 has a concentration of 15 mol % in the mixed refrigerant, and HFC-41 has a concentration of 10 mol % in the mixed refrigerant; the fifth type of refrigerant: HFO-1234yf has a concentration of 15 mol % in the mixed refrigerant; and the sixth type of refrigerant: HFC245fa has a concentration of 28 mol % in the mixed refrigerant.

The operating parameters are: condensing temperature of 25° C., refrigeration temperature of −150° C., discharge pressure of the compressor of 280 psi, and low pressure of 32 psi.

EXAMPLE 22

An environmental-friendly mixed refrigerant used at −150° C. was formulated, and the amount of substance concentration of each type of refrigerant is as follows.

The first type of refrigerant: R740 has a concentration of 5 mol % in the mixed refrigerant, and R728 has a concentration of 10 mol % in the mixed refrigerant; the second type of refrigerant: R-784 has a concentration of 2 mol % in the mixed refrigerant; the third type of refrigerant: R14 has a concentration of 25 mol % in the mixed refrigerant; the fourth type of refrigerant: R23 has a concentration of 10 mol % in the mixed refrigerant, and HFC-41 has a concentration of 5 mol % in the mixed refrigerant; the fifth type of refrigerant: HFO-1234yf has a concentration of 15 mol % in the mixed refrigerant; and the sixth type of refrigerant: HFC245fa has a concentration of 28 mol % in the mixed refrigerant.

The operating parameters are: condensing temperature of 25° C., refrigeration temperature of −150° C., discharge pressure of the compressor of 280 psi, and low pressure of 32 psi.

A mixed refrigerant for a cryogenic temperature range, and methods for preparing and applying the same provided by the present invention are described in detail above. The principles and embodiments of the present invention have been illustrated herein with reference to specific examples, and the description of the above examples is only to aid in understanding the method of the present invention and its main concept. It should be noted that those skilled in the art can make various improvements and modifications to the present invention without departing from the principles of the invention. These improvements and modifications also fall within the protection of the claims of the present invention.

It is to be understood that the term "comprise" or any other variants thereof herein is intended to encompass a non-exclusive inclusion, such that a process, method, article, or device including a series of elements includes not only those elements but also other elements that are not explicitly listed, or further includes elements inherent to such a process, method, article, or device. An element that is defined by the phrase "comprising a . . . " without more limitations does not exclude the presence of additional equivalent elements in the process, method, article, or device including the element.

The various examples in the present specification are described in a related manner. The same or similar parts between the various examples may be referred to each other, and each example focuses on the differences from other examples.

The above is only the preferred example of the present invention, and is not intended to limit the present invention. Any modifications, equivalents, improvements, etc. made within the spirit and principles of the present invention should be included within the scope of the present invention.

The invention claimed is:

1. A mixed refrigerant for a cryogenic temperature range, comprising six types of refrigerants,
wherein
a first type of refrigerant is argon or nitrogen;
a second type of refrigerant is methane or krypton;
a third type of refrigerant is tetrafluoromethane;
a fourth type of refrigerant is trifluoromethane or fluoromethane;
a fifth type of refrigerant is 2,3,3,3-tetrafluoro-1-propene and optionally at least one of hexafluoropropylene and pentafluoropropylene; and
a sixth type of refrigerant is at least one of 1,1,1,3,3-pentafluoropropane and 1,1,2,2,3-pentafluoropropane, wherein:
the first type of refrigerant has an amount of substance concentration of 2 mol % to 15 mol % in the mixed refrigerant;
the second type of refrigerant has an amount of substance concentration of 2 mol % to 15 mol % in the mixed refrigerant;
the third type of refrigerant has a concentration of 15 mol % to 40 mol % in the mixed refrigerant;
the fourth type of refrigerant has a concentration of 15 mol % to 30 mol % in the mixed refrigerant;
the fifth type of refrigerant has a concentration of 8 mol % to 25 mol % in the mixed refrigerant; and
the sixth type of refrigerant has a concentration of 15 mol % to 30 mol % in the mixed refrigerant.

2. The mixed refrigerant for the cryogenic temperature range according to claim 1,
wherein
the first type of refrigerant has a concentration of 2 mol % to 5 mol % in the mixed refrigerant;
the second type of refrigerant has a concentration of 5 mol % to 10 mol % in the mixed refrigerant;
the third type of refrigerant has a concentration of 25 mol % to 30 mol % in the mixed refrigerant;
the fourth type of refrigerant has a concentration of 25 mol % to 30 mol % in the mixed refrigerant;
the fifth type of refrigerant has a concentration of 15 mol % to 20 mol % in the mixed refrigerant; and
the sixth type of refrigerant has a concentration of 20 mol % to 30 mol % in the mixed refrigerant.

3. The mixed refrigerant for the cryogenic temperature range according to claim 1,
wherein
the first type of refrigerant has a concentration of 5 mol % to 10 mol % in the mixed refrigerant;
the second type of refrigerant has a concentration of 2 mol % to 5 mol % in the mixed refrigerant;
the third type of refrigerant has a concentration of 20 mol % to 30 mol % in the mixed refrigerant;
the fourth type of refrigerant has a concentration of 15 mol % to 20 mol % in the mixed refrigerant;
the fifth type of refrigerant has a concentration of 20 mol % to 25 mol % in the mixed refrigerant; and
the sixth type of refrigerant has a concentration of 20 mol % to 30 mol % in the mixed refrigerant.

4. The mixed refrigerant for the cryogenic temperature range according to claim 1,
wherein
the first type of refrigerant has a concentration of 5 mol % to 10 mol % in the mixed refrigerant;
the second type of refrigerant has an amount of substance concentration of 2 mol % to 5 mol % in the mixed refrigerant;
the third type of refrigerant has a concentration of 15 mol % to 25 mol % in the mixed refrigerant;
the fourth type of refrigerant has a concentration of 15 mol % to 20 mol % in the mixed refrigerant;
the fifth type of refrigerant has a concentration of 15 mol % to 25 mol % in the mixed refrigerant; and
the sixth type of refrigerant has a concentration of 20 mol % to 30 mol % in the mixed refrigerant.

5. The mixed refrigerant for the cryogenic temperature range according to claim 1, wherein
the first type of refrigerant has a concentration of 5 mol % to 10 mol % in the mixed refrigerant;
the second type of refrigerant has a concentration of 2 mol % to 10 mol % in the mixed refrigerant;
the third type of refrigerant has a concentration of 25 mol % to 30 mol % in the mixed refrigerant;
the fourth type of refrigerant has a concentration of 15 mol % to 20 mol % in the mixed refrigerant;
the fifth type of refrigerant has a concentration of 15 mol % to 20 mol % in the mixed refrigerant; and
the sixth type of refrigerant has a concentration of 15 mol % to 25 mol % in the mixed refrigerant.

6. The mixed refrigerant for the cryogenic temperature range according to claim 1, wherein
the first type of refrigerant has a concentration of 10 mol % to 15 mol % in the mixed refrigerant;
the second type of refrigerant has a concentration of 2 mol % to 5 mol % in the mixed refrigerant;
the third type of refrigerant has a concentration of 20 mol % to 25 mol % in the mixed refrigerant;
the fourth type of refrigerant has a concentration of 15 mol % to 20 mol % in the mixed refrigerant;
the fifth type of refrigerant has a concentration of 15 mol % to 25 mol % in the mixed refrigerant; and
the sixth type of refrigerant has a concentration of 20 mol % to 30 mol % in the mixed refrigerant.

7. The mixed refrigerant for the cryogenic temperature range according to claim 1, wherein
the first type of refrigerant has a concentration of 10 mol % to 15 mol % in the mixed refrigerant;
the second type of refrigerant has a concentration of 2 mol % to 5 mol % in the mixed refrigerant;
the third type of refrigerant has a concentration of 20 mol % to 25 mol % in the mixed refrigerant;
the fourth type of refrigerant has a concentration of 15 mol % to 25 mol % in the mixed refrigerant;
the fifth type of refrigerant has a concentration of 10 mol % to 15 mol % in the mixed refrigerant; and
the sixth type of refrigerant has a concentration of 20 mol % to 30 mol % in the mixed refrigerant.

8. A method for preparing the mixed refrigerant according to claim 1, comprising:
mixing a first type of refrigerant, a second type of refrigerant, a third type of refrigerant, a fourth type of refrigerant, a fifth type of refrigerant, and a sixth type of refrigerant at a normal temperature to obtain the mixed refrigerant,
wherein
the first type of refrigerant is argon or nitrogen;
the second type of refrigerant is methane or krypton;
the third type of refrigerant is tetrafluoromethane;
the fourth type of refrigerant is trifluoromethane or fluoromethane;

the fifth type of refrigerant is 2,3,3,3-tetrafluoro-1-propene and optionally at least one of hexafluoropropylene and pentafluoropropylene; and the sixth type of refrigerant is at least one of 1,1,1,3,3-pentafluoropropane and 1,1,2,2,3-pentafluoropropane, wherein the first type of refrigerant has a concentration of 2 mol % to 15 mol % in the mixed refrigerant;

the second type of refrigerant has a concentration of 2 mol % to 15 mol % in the mixed refrigerant;

the third type of refrigerant has a concentration of 15 mol % to 40 mol % in the mixed refrigerant;

the fourth type of refrigerant has a concentration of 15 mol % to 30 mol % in the mixed refrigerant;

the fifth type of refrigerant has a concentration of 8 mol % to 25 mol % in the mixed refrigerant; and the sixth type of refrigerant has a concentration of 15 mol % to 30 mol % in the mixed refrigerant.

9. A method for applying the mixed refrigerant according to claim 1, comprising: filling the mixed refrigerant into an automatic cascade refrigeration system.

\* \* \* \* \*